DOPPLER FREQUENCY VERSUS TIME

INVENTOR.
PETER C. SANDRETTO

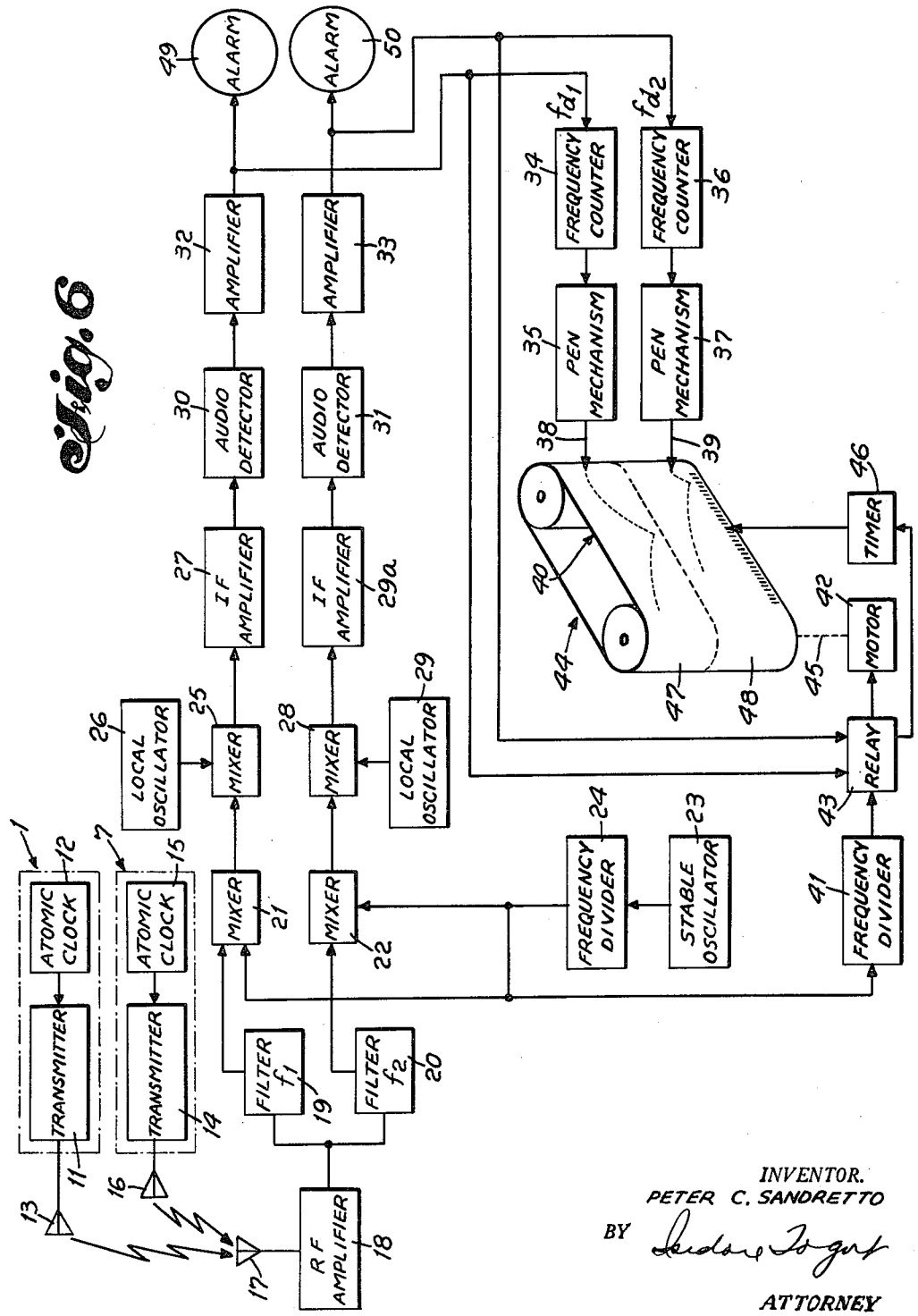

United States Patent Office 3,141,167
Patented July 14, 1964

3,141,167
NAVIGATION SYSTEM
Peter C. Sandretto, East Orange, N.J., assignor to International Telephone and Telegraph Corporation, Nutley, N.J., a corporation of Maryland
Filed Dec. 7, 1959, Ser. No. 857,738
6 Claims. (Cl. 343—112)

This invention relates to navigation and more particularly to a navigation system utilizing transmitted signals from an artificial earth satellite to determine the position of a vehicle.

For years the unsolved radio navigation problem was that of providing signal coverage over long distances (1500 miles or more). Signal coverage at these distances involves the use of low frequencies. These frequencies (of the order of 14 kilocycles) are very susceptible to atmospheric noises. Further, it is difficult to produce modulations which can be used to resolve positional ambiguities. Ideally, the best navigation frequencies lie in the centrimetric wavebands; however, the line-of-sight limitations of these frequencies have precluded their use for long ranges. In order to provide navigational coverage over long ranges with frequencies which are line-of-sight limited, it is proposed to use an earth satellite. Such a satellite would have an apogee of approximately 1500 miles and a perigee of 300 miles; therefore, at any instance it could provide coverage to a distance of not less than 2,000 miles. Since the satellite would be continuously rotating about the earth with a period of approximately 90 minutes, it would therefore continuously furnish positional information over a large belt on the surface of the earth.

It is an object of this invention to provide a long range navigation system for vehicles using line-of-sight signal frequencies transmitted from an earth satellite.

Another object is to provide a receiving system for the vehicle that is reliable, inexpensive and simple to operate.

Still another object is to provide a receiving system for the vehicle which will provide information received from an earth satellite from which the navigator of the vehicle can easily determine his position.

A feature of this invention is a method for determining the position of a vehicle relative to a source of electromagnetic radiation moving along a known path spaced apart from the earth and at a known velocity. This method provides for receiving the signals radiated from the known source with Doppler modulations produced by the movement of the source relative the vehicle, detecting the Doppler modulations from the received signals, determining the frequencies of the Doppler modulations recording the Doppler frequencies as a function of time in the form of a graph and determining from this graph recording the rate of change of Doppler frequency at the time of closest approach of the satellite to the vehicle. Further, using this rate of change of Doppler frequency, the navigator of the vehicle can now calculate the slant range of the vehicle relative the source at the time of nearest approach of the source to the vehicle utilizing the known velocity of the source and the known frequency of the signals transmitted from the source, and determining from the slant range the distance of the vehicle from the vertical projection of the source upon the earth at the time of closest approach.

Another feature is in a navigation system for determining the position of a vehicle relative the source of electromagnetic radiation which moves along the known path spaced apart from the earth and at the known velocity, a receiver carried by the vehicle for receiving signals including the transmitted radiations. The receiver further has means to detect from the received signals the Doppler modulations produced by the movement of the source relative the vehicle, means to determine the frequencies of the Doppler modulation signals and a recorder to record the Doppler frequency as a function of time, whereby the position of the vehicle relative the source can be computed.

A further feature is that the receiving system contains means to activate the recording means only during the time that signals are being received from the source and an alarm to apprise the navigator that such signals are being received from the source.

The above-mentioned and other features and objects of this invention will become more apparent by reference to the following description taken in conjunction with the accompanying drawings, in which:

FIG. 6 is the embodiment of the receiving system of this invention.

In the satellite it is proposed to have a simple transmitter operating from a highly stabilized oscillator such as an atomic clock and a frequency divider. The transmitting system should be in duplicate to guard against failure, and the output of the transmitter should be of the order of ten watts with the primary power obtained by means of solar cells. At the time of launching of the satellite, the phase of the atomic clock is accurately locked to the phase of similar clocks at several known positions on the surface of the earth. Therefore, the phase difference can be used as a measure of the distance of the satellite from the ranging point. Location can further be determined through the use of a long base line interferometric system. In a comparatively short period of time after the satellite is launched, it will be possible to publish an ephemeris which will give the location of the satellite at all times. The trajectory of the satellite is exactly known in terms of the earth's coordinates at any time. With such information it is possible to detemine the position of a radio tracking station, such as a ship. The accurate rate of change of freqenucy measurement (Doppler shift) permits the determination of the minimum slant range $r_0$ to satellite in accordance with following relationship:

$$r_0 \approx \frac{f_0 v^2}{c\left(\frac{df}{dt}\right)_{t_0}}$$

where $v$ is the known velocity of the satellite, $f_0$ is the known frequency of the radio transmitter in the satellite and $$\left(\frac{df}{dt}\right)_{t_0}$$

is the rate of change of frequency at the time of closest approach $t_0$. With $r_0$ calculated, the position of the radio tracking station can be determined from the known trajectory or orbital path of the satellite.

Figure 1:
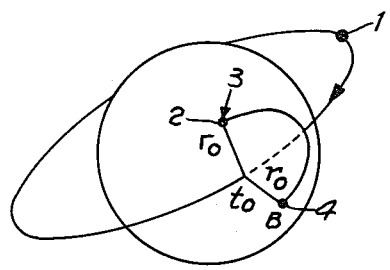
FIG. 1 is an illustration showing a satellite moving in its orbit about the earth.
Figure 3:
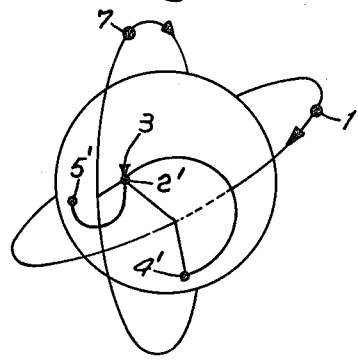
FIG. 3 is an illustration showing two satellite in their orbital paths about the earth.
Figure 2:
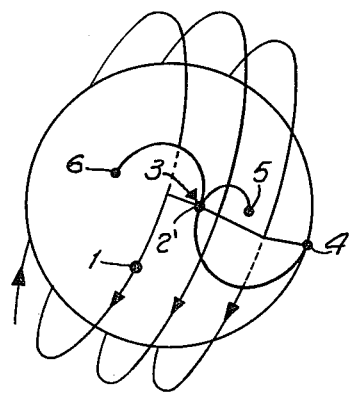
FIG. 2 is an illustration similar to FIG. 1 but showing successive paths of the satellite about the earth.

FIG. 1 shows in the case of a three-dimensional trajectory of a satelilte 1 that the position 2 of the radio tracking station 3 is at the intersection of the earth's sphere with a circle of radius $r_0$ in a plane perpendicular to the satellite trajectory at the time $t_0$. However, there is an ambiguity between the actual position 2 and the apparent position 4 because it cannot be ascertained on which side of the satellite trajectory the vehicle is located. This ambiguity can be solved if a determination is made on successive passes of the satellite (every 90 minutes or so). In that case it can be seen according to the FIG. 2 that the actual position 2' is easily discriminated because the ambiguous apparent positions 4, 5 and 6 would correspond to a velocity of the tracking station 3 much too high. The ambiguity could be resolved also by receiving signals from two or more satellites with different trajectories as shown in FIG. 3, where a second satellite 7 travels in an orbit perpendicular to the orbit of satellite 1. However, it is not necessary that the orbit of one be perpendicular to the other. There should be sufficient satellites traveling around the earth to provide positional information for vehicles no matter what their positions may be on the surface of the earth.

Figure 4:
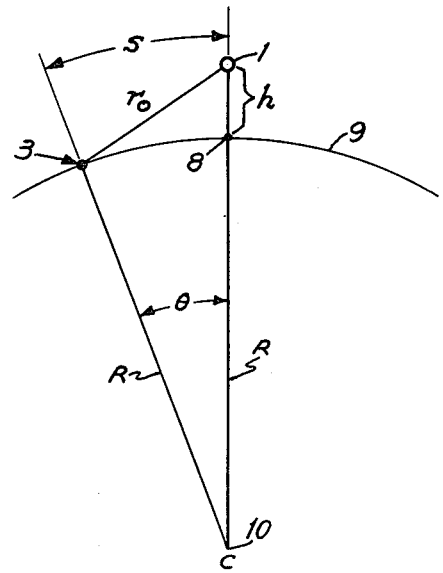
FIG. 4 is a geometrical diagram useful in explaining the determination of the position of the vehicle.

Referring to FIG. 4, it can be seen that having determined $r_o$, the distance $s$ of the tracking station from the vertical projection 8 of the satellite 2 upon the earth's surface 9 can be ascertained from the relationship $s=R\theta$ where $\theta$ is the angle in radians between lines joining the earth's center 10 with the tracking station 3 and the satellite 1 and R is the radius of the earth. Therefore, $$\theta = \cos^{-1} \frac{(h+R)^2 + R^2 - r_o^2}{2R(h+R)}$$

where $h$=the height of the satellite above the earth at time $t_o$.

Figure 5:
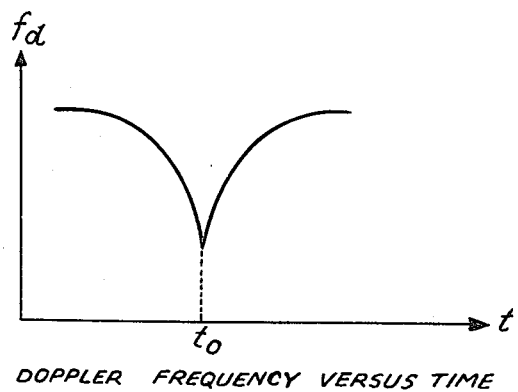
FIG. 5 is a graph of Doppler frequency versus time.

Referring now to FIG. 6, there is shown the receiving system of this invention that is carried by the tracking station 3. It is assumed that at least two satellites are transmitting, one at a frequency $f_1$ and the other at a frequency $f_2$. Satellite 1 contains a transmitter controlled by an atomic clock 12 and transmits signals at a frequency $f_1$ from antenna 13. Satellite 7 carries a transmitter 14 controlled by atomic clock 15 and transmits signals $f_2$ from antenna 16. Signals from the satellites are received by antenna 17 of the receiving station and are fed to a radio frequency amplifier 18. The output of the RF amplifier 18 is fed to a filter 19 which has a bandpass centered around frequency $f_1$ and a filter 20 with a bandpass centered about frequency $f_2$. The RF amplifier of course has a bandwidth capable of receiving signals of frequencies $f_1$ and $f_2$. The output of filter 19 is fed to a mixer 21, the output of filter 20 is fed to a mixer 22. A highly stable oscillator 23 which may be an atomic clock similar to the atomic clock 12 in the satellite 1 is coupled to a frequency divider 24. The output of the frequency divider 24 is fed to mixers 21 and 22. The heterodyned output of mixer 21 is coupled to a mixer 25 to which is also fed the output of a local oscillator 26 and the output of the mixer 25 is coupled to an intermediate frequency amplifier 27. Similarly, the output of mixer 22 is fed to a mixer 28 and that frequency is beat against the frequency of a local oscillator 29 to derive an output of the mixer 28 that is fed into an intermediate frequency amplifier 29a. The doppler modulations of the first satellite transmitting frequency $f_1$ are detected in the audio detector 30 from the output of intermediate frequency amplifier 27. Doppler modulations of the second satellite's transmitted frequency $f_2$ are detected in the audio detector 31. The output of audio detector 30 is coupled to amplifier 32 and the output of the audio detector 31 is coupled to amplifier 33. The output of amplifier 32 is fed to a frequency counter 34 which in turn is coupled to a pen mechanism 35. The output of amplifier 33 is coupled to a frequency counter 36 and the output of frequency counter 36 is coupled to pen mechanism 37. Pen mechanisms 35 and 37 control respectively pens 38 and 39 to write on the moving recording chart 40 and thus give an indication of the two doppler frequencies $f_{d1}$ and $f_{d2}$. The output of frequency divider 24 is also fed to a freqenucy divider 41, the output of which is an audio frequency signal to drive a motor 42. However, the output of frequency divider 41 is coupled to a relay 43 and relay 43 will couple the output of frequency divider 41 to motor 42 only when it is actuated by an output of either amplifier 32 or 33 or both. The motor 42 is coupled to the chart mechanism 44 by means of shaft 45. A timer 46 is coupled to the chart 40 to provide thereon the notation of time. The recording that is thus made upon the chart is that of the doppler frequency versus time, shown in FIG. 5, for each of the doppler frequencies $f_{d1}$ and $f_{d2}$. It is evidenced from an inspection of the graph of FIG. 5 that at the time when the receiver first received signals from the satellite, the frequency change of the doppler frequency is slight. As the satellite approaches to the point of closest approach to the tracking station 3, the frequency change is more rapid and the slope of the recording is correspondingly steeper. At the time $t_o$ of the nearest approach to the tracking station, the doppler frequency is zero and then as it moves away, the beat frequency again increases at the same rate as before until it reaches a point where the signals can no longer be received from the satellite. This chart then immediately gives the time $t_o$ the point of closest approach of the satellite to the tracking station.

$$\frac{df}{dt}$$

at $t_o$ or the slope of the line can then be obtained in the usual manner on either side of $t_o$. The chart mechanism 44 is arranged so that both pens can simultaneously write upon the chart as it is moving past the pens and therefore if signals are being received from both satellites, two graphs 47 and 48 can be made simultaneously. It is obvious of course that with one signal being received only one graph will be made. To apprise the navigator that a signal is being received from either one of the satellites or both of them, alarms 49 and 50 are coupled respectively to the outputs of amplifiers 32 and 33. These alarms can be of both the visual and the audible type so that the navigator can attend to the recording during such time as signals are being received. He thus does not have to watch the receiver at all times. When the recording is completed, the navigator can immediately ascertain for each of the satellites the time, $t_o$ of closest approach of the satellite to the vehicle. He can also determine from the graph of the recording the slope $$\left(\frac{df}{dt}\right)_{t_o}$$

and therefore calculate $r_o$, the minimum slant range, from the equation $$r_o \approx \frac{f_o v^2}{c\left(\frac{df}{dt}\right)_{t_o}}$$

The minimum slant range and the time $t_o$ of each satellite thus being known, the navigator can ascertain from the ephemeris the position of the satellite at time $t_o$ and the height of the satellite above the earth. The position of the vehicle relative each satellite will then be derived as explained above. The coincidence of two position derivations, one relative each satellite will determine the actual position of the vehicle on the earth without ambiguity.

Since position is only determined once every 90 minutes in the case of one satellite, it is necessary to have a means of carrying over position between fixes. This may be accomplished through the use of an inertial navigation system which can be corrected at 90 minute intervals. A simple dead reckoning system, corrected by the satellite system described above, can also serve for this purpose.

It is to be understood that although this invention discloses an embodiment for reception of signals from two satellites, more than two satellites or only one can be utilized in this system by providing a receiver with appropriate bandwidth and similar additional circuitry in conjunction with that already shown. The recording device 44 would obviously be expanded to permit additional recording thus required for the added satellites.

The doppler shift due to the component of the satellite's motion in the direction of the radio tracking station will be subjected to two kinds of ionospheric errors. The first type is due to the presence of ionization about the satellite itself. The index of refraction of the medium in which the signal source is immersed is therefore effective, giving rise to an increment in the doppler shift. The second type of doppler error arises from the change in propagation velocity of the radio wave as it traverses the ionosphere. The effects of ionospheric refraction on the ray path should be reduced to a negligible amount. To do this, particularly in the presence of sporadic or auroral types of ionization, the transmitted frequency from the satellite should be in the region of 1,000 megacycles or higher.

While I have described above the principles of my invention in connection with specific apparatus, it is to be clearly understood that this description is made only by way of example and as a limitation to the scope of my invention as set forth in the objects thereof and in the accompanying claims.

I claim:

1. In a navigation system for determining the position of a vehicle relative a source of electromagnetic radiations moving along a known path spaced apart from the earth and at a known velocity; comprising a receiver carried by said vehicle for receiving signals including said radiations, means to detect from said received radiations the doppler modulations produced by the movement of said source relative said vehicle, a frequency counter coupled to said detecting means to determine the frequencies of said doppler modulations and recording means coupled to the output of said frequency counter whereby said doppler frequencies are recorded as a function of time and the position of said vehicle relative said source can be computed and means coupling said recording means to the output of said detecting means to actuate said recording means in response to an output from said detecting means.

2. In a navigation system for determining the position of a vehicle relative a source of electromagnetic radiations moving along a known path spaced apart from the earth and at a known velocity; comprising a receiver carried by said vehicle for receiving signals including said radiations, filter means to pass only said radiations and doppler modulations produced by the movement of said source relative said vehicle, a stable oscillator, a first mixer, a first frequency divider coupling said stable oscillator to said first mixer, a second mixer, means coupling the output of said first mixer to said second mixer, a local oscillator, means coupling the output of said local oscillator to said second mixer, an audio detector, an intermediate frequency amplifier coupling the output of said second mixer to said audio detector to produce as the output thereof said doppler modulations, a frequency counter, an amplifier coupling the output of said audio detector to said frequency counter, recording means, means coupling the output of said frequency counter to said recording means to record said doppler modulation frequencies on said recording means, means to record on said recording means time indications whereby the doppler modulation frequencies are recorded on said chart as a function of time, from which the position of said vehicle relative said source can be computed and means coupling said recording means to the output of said amplifier to actuate said recording means in response to an output from said amplifier.

3. In a navigation system for determining the position of a vehicle relative a source of electromagnetic radiations moving along a known path spaced apart from the earth and at a known velocity; comprising a receiver carried by said vehicle for receiving signals including said radiations, filter means to pass only said radiations and doppler modulations produced by the movement of said source relative said vehicle, a stable oscillator, a first mixer, a first frequency divider coupling said stable oscillator to said first mixer, a second mixer, means coupling the output of said first mixer to said second mixer, a local oscillator, means coupling the output of said local oscillator to said second mixer, an audio detector, an intermediate frequency amplifier coupling the output of said second mixer to said audio detector to produce as the output thereof said doppler modulations, a frequency counter, an amplifier coupling the output of said audio detector to said frequency counter, recording means, means coupling the output of said frequency counter to said recording means, a timer, means coupling the output of said timer to said recording means to record thereon time indications whereby the doppler modulation frequencies are recorded on said recording means as a function of time, and the position of said vehicle relative said source can be computed and means coupling said recording means to the output of said amplifier to actuate said recording means in response to an output from said amplifier.

4. In a navigation system for determining the position of a vehicle relative a source of electromagnetic radiations moving along a known path spaced apart from the earth and at a known velocity; comprising a receiver carried by said vehicle for receiving signals including said radiations, filter means to pass only said radiations and doppler modulations produced by the movement of said source relative said vehicle, a stable oscillator, a first mixer, a first frequency divider coupling said stable oscillator to said first mixer, a second mixer, means coupling the output of said first mixer to said second mixer, a local oscillator, means coupling the output of said local oscillator to said second mixer, an audio detector, an intermediate frequency amplifier coupling the output of said second mixer to said audio detector to produce as the output thereof said doppler modulations, a frequency counter, an amplifier coupling the output of said audio detector to said frequency counter, a pen mechanism, means coupling the output of said frequency counter to said pen mechanism, a recording chart, means for moving said chart past said pen mechanism whereby said pen mechanism continuously records said doppler modulation frequencies along the ordinate axis on said chart, a second frequency divider coupled to the output of said first frequency divider, a timer, means coupling the output of said timer to said recording chart to record thereon along the abscissa axis the time indications whereby the doppler modulation frequencies are recorded on said chart as a function of time, from which the position of said vehicle relative said source can be computed and means coupling said chart moving means to the output of said amplifier to actuate said chart moving means in response to an output from said amplifier.

5. In a navigation system for determining the position of a vehicle relative a source of electromagnetic radiations moving along a known path spaced apart from the earth and at a known velocity; comprising a receiver carried by said vehicle for receiving signals including said radiations, filter means to pass only said radiations and doppler modulations produced by the movement of said source relative said vehicle, a stable oscillator, a first mixer, a first frequency divider coupling said stable oscillator to said first mixer, a second mixer, means coupling the output of said first mixer to said second mixer, a local oscillator, means coupling the output of said local oscillator to said second mixer, an audio detector, an intermediate frequency amplifier coupling the output of said second mixer to said audio detector to produce as the output thereof said doppler modulations, a frequency counter, an amplifier coupling the output of said audio detector to said frequency counter, a pen mechanism, means coupling the output of said frequency counter to said pen mechanism, a recording chart, means for moving said chart past said pen mechanism whereby said pen mechanism continuously records said doppler modulation frequencies along the ordinate axis on said chart, a second frequency divider coupled to the output of said first frequency divider, a relay coupling the output of said second frequency divider to said moving means, a timer, means coupling the output of said timer to said recording chart to record thereon along the abscissa axis the time indications whereby the doppler modulation frequencies are recorded on said chart as a function of time, means coupling the output of said amplifier to the actuating coils of said relay whereby said relay causes said moving means and said timer to operate when said doppler modulations are being received, from which the position of said vehicle relative said source can be computed.

6. In a navigation system for determining the position of a vehicle relative a source of electromagnetic radiations moving along a known path spaced apart from the earth and at a known velocity; comprising a receiver carried by said vehicle for receiving signals including said radiations, filter means to pass only said radiations and doppler modulations produced by the movement of said source relative said vehicle, a stable oscillator, a first mixer, a first frequency divider coupling said stable oscillator to said first mixer, a second mixer, means coupling the output of said first mixer to said second mixer, a local oscillator, means coupling the output of said local oscillator to said second mixer, an audio detector, an intermediate frequency amplifier coupling the output of said second mixer to said audio detector to produce as the output thereof said doppler modulations, a frequency counter, an amplifier coupling the output of said audio detector to said frequency counter, a pen mechanism, means coupling the output of said frequency counter to said pen mechanism, a recording chart, means for moving said chart past said pen mechanism whereby said pen mechanism continuously records said doppler modulation frequencies along the ordinate axis on said chart, a second frequency divider coupled to the output of said first frequency divider, a relay coupling the output of said second frequency divider to said moving means, a timer, means coupling the output of said timer to said recording chart to record thereon along the abscissa axis the time indications whereby the doppler modulation frequencies are recorded on said chart as a function of time, means coupling the output of said amplifier to the actuating coils of said relay whereby said relay causes said moving means and said timer to operate when said doppler modulations are being received, an alarm, means coupling the output of said amplifier to said alarm to indicate that said doppler modulations are being received and are being recorded, from which the position of said vehicle relative said source can be computed.

References Cited in the file of this patent

"Missiles and Rockets," October 1956, vol. 1, No. 1, pp. 48–52.

"Astronautica Acta," March 1959, vol. 5, No. 1, p. 30.

I.R.E. National Convention Record, Part 5, March 1959, pp. 54–66.